United States Patent
Chen et al.

(10) Patent No.: US 11,533,202 B2
(45) Date of Patent: Dec. 20, 2022

(54) SOUNDING REFERENCE SIGNAL TRANSMISSION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Wenhong Chen, Dongguan (CN); Zhihua Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 252 days.

(21) Appl. No.: 16/992,033

(22) Filed: Aug. 12, 2020

(65) Prior Publication Data

US 2020/0374157 A1     Nov. 26, 2020

Related U.S. Application Data (63) Continuation of application No. PCT/CN2018/076775, filed on Feb. 13, 2018.

(51) Int. Cl.
*H04W 72/04*   (2009.01)
*H04L 25/02*   (2006.01)
(Continued)

(52) U.S. Cl.
CPC ........ *H04L 25/0226* (2013.01); *H04L 5/0051* (2013.01); *H04L 5/0092* (2013.01);
(Continued)

(58) Field of Classification Search
CPC ........... H04W 72/042; H04W 72/0446; H04W 72/1268; H04W 80/08; H04L 25/0226; H04L 5/0051; H04L 5/0092; H04L 5/0094
See application file for complete search history.

(56) References Cited

U.S. PATENT DOCUMENTS

2012/0281625 A1   11/2012   Noh
2013/0294318 A1*  11/2013   Amerga ................ H04W 4/06
                                                       370/312
(Continued)

FOREIGN PATENT DOCUMENTS

CN   101827444 A   9/2010
CN   102469609 A   5/2012
(Continued)

OTHER PUBLICATIONS

International Search Report in the international application No. PCT/CN2018/076775, dated Nov. 5, 2018.
(Continued)

*Primary Examiner* — Wei Zhao
(74) *Attorney, Agent, or Firm* — Ladas & Parry, LLP (57) ABSTRACT

Provided are a sounding reference signal (SRS) transmission method, a terminal device and a network device. When a slot configured by a network device through high-layer signaling does not include any time-domain resource available for SRS transmission or time-domain resources therein are not adequate, a terminal device may determine a slot for SRS transmission, thereby finding a proper uplink resource for sending an SRS to further ensure the uplink transmission performance. The method includes that: a terminal device receives downlink control information (DCI) from a network device, the DCI including SRS triggering signaling and the SRS triggering signaling indicating SRS transmission on at least one SRS resource set; and the terminal device transmits an SRS on a target SRS resource in the at least one SRS resource set in a slot meeting a first preset condition and after K slots from reception of the DCI, K being a nonnegative integer.

14 Claims, 2 Drawing Sheets

(51) Int. Cl.
*H04L 5/00* (2006.01)
*H04W 72/12* (2009.01)
*H04W 80/08* (2009.01)

(52) U.S. Cl.
CPC ..... *H04W 72/042* (2013.01); *H04W 72/0446* (2013.01); *H04W 72/1268* (2013.01); *H04W 80/08* (2013.01)

(56) References Cited

U.S. PATENT DOCUMENTS

| | | | |
|---|---|---|---|
| 2015/0092635 | A1 | 4/2015 | Noh et al. |
| 2016/0087771 | A1 | 3/2016 | Noh et al. |
| 2017/0127442 | A1 | 5/2017 | Sun et al. |
| 2019/0174466 | A1* | 6/2019 | Zhang ............... H04L 5/0057 |
| 2019/0215110 | A1 | 7/2019 | Yang et al. |
| 2020/0404593 | A1* | 12/2020 | Yao ................... H04W 52/10 |

FOREIGN PATENT DOCUMENTS

| | | | |
|---|---|---|---|
| CN | 103096346 | A | 5/2013 |
| CN | 103945541 | A | 7/2014 |
| CN | 101827444 | B | 3/2015 |
| CN | 106685616 | A | 5/2017 |
| CN | 106992804 | A | 7/2017 |
| CN | 107182092 | A | 9/2017 |
| CN | 107294686 | A | 10/2017 |
| CN | 109565840 | A | 4/2019 |
| WO | 2017167304 | A1 | 10/2017 |

OTHER PUBLICATIONS

First Office Action of the Chinese application No. 201880002998.5, dated Jan. 3, 2020.
Second Office Action of the Chinese application No. 201880002998. 5, dated Mar. 20, 2020.
Third Office Action of the Chinese application No. 201880002998. 5, dated May 28, 2020.
"Summary of remaining details of SRS design", 3GPP TSG RAN WG1 Ad Hoc Meeting R1-1800090, Huawei, mailed on Jan. 26, 2018, entire document; English and Chinese markings versions.
"Discussion on SRS design for NR", 3GPP TSG RAN WG1 Meeting NR#3 R1-1715451, ZTE, mailed on Sep. 21, 2017, entire document.
"Summary of SRS", 3GPP TSG RAN WG1 Ad Hoc-1801 Meeting R1-1801178, Sony, mailed on Jan. 26, 2018, entire document; English and Chinese markings versions.
"Remaining issues and text proposals on SRS design", 3GPP TSG RAN WG1 Meeting AH 1801 R1-1800192, vivo, mailed on Jan. 26, 2018, entire document.
"Remaining details on SRS design in NR", 3GPP TSG RAN WG1 Meeting AH 1801 R1-1800758, Nokia, mailed on Jan. 26, 2018, entire document.
"Text proposal for SRS", 3GPP TSG RAN WG1 Meeting AH 1801 R1-1800485, OPPO, mailed on Jan. 26, 2018, entire document.
Written Opinion of the International Searching Authority in international application No. PCT/CN2018/076775, dated Nov. 5, 2018 with English translation provided by Google Translate.
Supplementary European Search Report in the European application No. 18906010.6, dated Jan. 14, 2021.
Written Opinion of the International Search Authority in the international application No. PCT/CN2018/076775, dated Nov. 5, 2018.
3GPP TSG RAN WG1 Meeting AH 1801 R1-1800238, Vancouver, Canada, Jan. 22-26, 2018, Source: CATT, Title: Remaining issues on non-codebook based UL transmission, Agenda Item: 7.2.1.3, Document for: Discussion and Decision, entire document, (cited in First Office Action of the Japanese application No. 2020-542971, issued on Feb. 4, 2022 and this item of information has relevance at least as described therein).
First Office Action of the Japanese application No. 2020-542971, dated Feb. 4, 2022.
Office Action of the Indian application No. 202027036984, dated Aug. 19, 2021.
First Office Action and search report of the Chinese application No. 202010997930.4, dated May 16, 2022.

* cited by examiner

FIG. 1

| 200 | A terminal device receives DCI from a network device, the DCI including SRS triggering signaling and the SRS triggering signaling being configured to indicate SRS transmission on at least one SRS resource set | ∼S210 |

| The terminal device transmits an SRS on a target SRS resource in the at least one SRS resource set in a slot meeting a first preset condition and after K slots from reception of the DCI, K being a nonnegative integer | ∼S220 |

FIG. 2

| 300 | A network device sends DCI to a terminal device, the DCI including SRS triggering signaling and the SRS triggering signaling being configured to indicate SRS transmission on at least one SRS resource set | ∼S310 |

| The network device receives an SRS on a target SRS resource in the at least one SRS resource set in a slot meeting a first preset condition and after K slots from sending of the DCI, K being a nonnegative integer | ∼S320 |

SOUNDING REFERENCE SIGNAL TRANSMISSION METHOD, TERMINAL DEVICE AND NETWORK DEVICE

CROSS-REFERENCE TO RELATED APPLICATION

This application is a continuation of International Patent Application No. PCT/CN2018/076775, filed on Feb. 13, 2018, the content of which is hereby incorporated by reference in its entirety.

TECHNICAL FIELD

The disclosure relates to the field of communication, and more particularly to a sounding reference signal (SRS) transmission method, a terminal device and a network device.

BACKGROUND

In 5-Generation New Radio (5G NR), a network device may preconfigure one or more aperiodic SRS resource sets and trigger a terminal device through triggering signaling in downlink control information (DCI) to implement transmission based on one of the aperiodic SRS resource sets. The terminal device, once receiving the triggering signaling, may transmit an SRS based on an SRS resource in a target SRS resource set. However, when the network device does not configure any time-domain resource for SRS transmission or time-domain resources configured for SRS transmission by the network device are not adequate, the terminal device cannot determine a time-domain resource for SRS transmission.

SUMMARY

A first aspect of the embodiments of the disclosure provides a method for SRS transmission, which may include that:

a terminal device receives DCI from a network device, the DCI including SRS triggering signaling and the SRS triggering signaling being configured to indicate SRS transmission on at least one SRS resource set; and the terminal device transmits an SRS on a target SRS resource in the at least one SRS resource set in a slot meeting a first preset condition and after K slots from reception of the DCI, K being a nonnegative integer.

A second aspect provides a terminal device, which includes a processor, a memory and a communication interface. The processor may be connected with the memory and the communication interface. The memory may store instructions, the processor may execute the instructions, and the communication interface may communicate with another network element under control of the processor. When the processor execute the instructions stored in the memory, such execution enables the processor to implement the method in the first aspect or any possible implementation mode of the first aspect.

A third aspect provides a non-transitory computer readable medium, having a program code stored therein that, when executed by a processor of a terminal device, cause the terminal device to implement the method in the first aspect.

DETAILED DESCRIPTION

The technical solutions in the embodiments of the disclosure will be clearly and completely described below in combination with the drawings in the embodiments of the disclosure.

The technical solutions of the embodiments of the disclosure may be applied to a 5G NR communication system.

In the embodiments of the disclosure, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle device, a wearable device, UE in a 5G network, UE in a future evolved Public Land Mobile Network (PLMN) or the like. There are no limits made in the embodiments of the disclosure.

Each embodiment of the disclosure is described in combination with a network device. The network device in the embodiments of the disclosure may be a device configured to communicate with UE. The network device may be an Evolutional NodeB (eNB or eNodeB) in a Long Term Evolution (LTE) system, or a radio controller in a Cloud Radio Access Network (CRAN) scenario. Or the network device may be a relay station, an access point, a vehicle device, a wearable device, a Next Generation Evolutional NodeB (NG-eNB), an access network device (for example, gNB) in a 5G network, an access network device in a future evolved PLMN or the like. There are no limits made in the embodiments of the disclosure.

Figure 1:
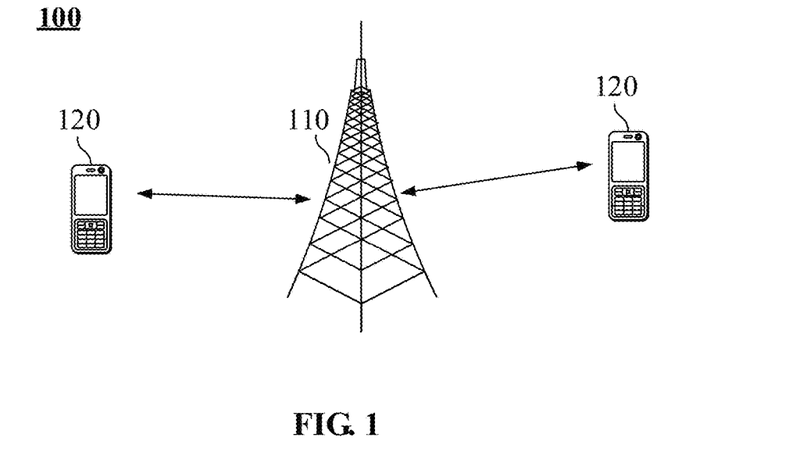
FIG. 1 is a schematic diagram of an application scenario according to an embodiment of the disclosure.

One network device and two terminal devices are exemplarily shown in FIG. 1. Optionally, the wireless communication system 100 may include multiple network devices and another number of terminal devices may be included in coverage of each network device. There are no limits made thereto in the embodiments of the disclosure.

Optionally, the wireless communication system 100 may further include another network entity such as an Access and Mobility Management Function (AMF), a Session Management Function (SMF), Unified Data Management (UDM) and an Authentication Server Function (AUSF). There are no limits made thereto in the embodiments of the disclosure.

In addition, each aspect or characteristic of the disclosure may be implemented as a method, a device or a product programed with a standard and/or using an engineering technology. Term "product" used in the disclosure covers a computer program which may be accessed from any computer-readable device, carrier or medium. For example, a computer-readable medium may include, but not limited to: a magnetic storage device (for example, a hard disk, a floppy disk or a magnetic tape), an optical disk (for example, a Compact Disc (CD) and a Digital Versatile Disc (DVD)), a smart card and a flash memory (for example, an Erasable Programmable Read-Only Memory (EPROM), a card, a stick or a key driver). In addition, various storage media described in the disclosure may represent one or more devices and/or other machine-readable media configured to store information. Term "machine-readable medium" may include, but not limited to, various media capable of storing, including and/or bearing instructions and/or data.

It is to be understood that terms "system" and "network" in the disclosure may be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
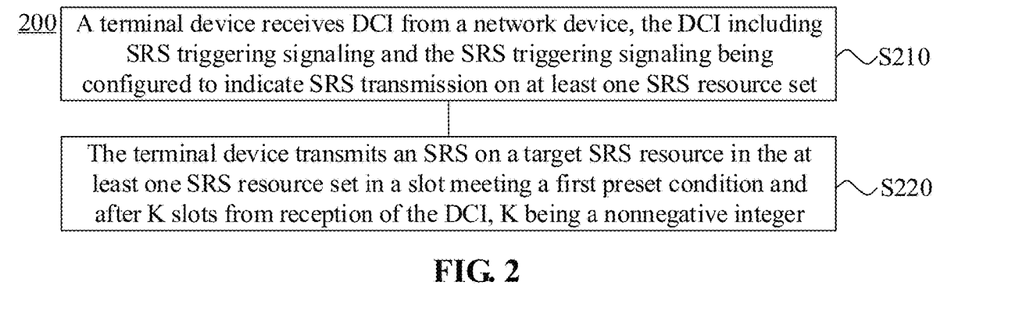
FIG. 2 is a schematic flowchart of an SRS transmission method according to an embodiment of the disclosure.

FIG. 2 is a schematic flowchart of an SRS transmission method 200 according to an embodiment of the disclosure. The method 200 may optionally be applied, but not limited, to the system shown in FIG. 1. The method 200 includes at least part of following contents.

In S210, a terminal device receives DCI from a network device, the DCI including SRS triggering signaling and the SRS triggering signaling being configured to indicate SRS transmission on at least one SRS resource set.

Optionally, the SRS triggering signaling may trigger periodic SRS transmission and may also trigger aperiodic SRS transmission.

For example, the SRS triggering signaling may include two DCI bits, and the two DCI bits may include four indication values. Three different indication values are configured to trigger different SRS resource sets, and the other indication value is configured to indicate to not trigger SRS transmission.

It is to be understood that two PUSCH mapping types are defined in 5G NR. A starting OFDM symbol of a PUSCH mapping type A is a first symbol in a slot, namely a PUSCH starts from a starting position of the slot. A starting OFDM symbol of a PUSCH mapping type B is configurable and may be any OFDM symbol in a slot. The PUSCH mapping type B does not support simultaneous transmission together with an SRS.

In S220, the terminal device transmits an SRS on a target SRS resource in the at least one SRS resource set in a slot meeting a first preset condition and after K slots from reception of the DCI, K being a nonnegative integer.

Optionally, a value of K may be configured for the at least one SRS resource set by the network device through high-layer signaling, namely K is configured for the at least one SRS resource and each state of the SRS triggering signaling corresponds to a value of K applied to all triggered SRS resource sets. K may be configured by a network side for each state of the SRS triggering signaling respectively.

Optionally, a value of K may be configured for each SRS resource set among the at least one SRS resource set by the network device through high-layer signaling respectively.

Optionally, a value of K may be configured for each SRS resource in the at least one SRS resource set by the network device through high-layer signaling respectively.

Optionally, all symbols in the slot meeting the first preset condition may be uplink symbols.

For example, Slot Format Indicator (SFI) information corresponding to the slot may indicate that all the symbols in the slot are uplink symbols.

Optionally, there may be at least M uplink symbols in the slot meeting the first preset condition, M being a positive integer.

For example, the SFI information corresponding to the slot may indicate that there are M uplink symbols in the slot, M being a predetermined value and M being a positive integer.

Optionally, last N symbols in the slot meeting the first preset condition may be all uplink symbols, N being a positive integer.

For example, the SFI information corresponding to the slot may indicate that the last N symbols in the slot are all uplink symbols, N being a predetermined value and N being a positive integer.

Optionally, the slot meeting the first preset condition may be not configured to transmit a PUCCH in a target PUCCH format.

For example, the target PUCCH format is a PUCCH format 0 or a PUCCH format 2, which is a PUCCH format configured to send a short PUCCH.

For another example, the target PUCCH format is a PUCCH format 1 or a PUCCH format 3 or a PUCCH format 4, which is a PUCCH format configured to send a long PUCCH.

Optionally, all OFDM symbols allocated to any SRS resource in the at least one SRS resource set in the slot meeting the first preset condition may be uplink symbols.

The network device may allocate respective OFDM symbols to each SRS resource in the at least one SRS resource set. For example, a starting symbol index and an occupied symbol number are configured for each SRS resource, so that the allocated continuous OFDM symbols can be determined.

Optionally, all OFDM symbols allocated to the target SRS resource in the slot meeting the first preset condition may be uplink symbols.

For example, a starting symbol index and an occupied symbol number are configured for the target SRS resource, so that the allocated continuous OFDM symbols can be determined.

Optionally, all the OFDM symbols allocated to any SRS resource in the at least one SRS resource set in the slot meeting the first preset condition may be not occupied by a PUCCH.

It is to be understood that an OFDM symbol allocated to a SRS resource is not occupied by a PUCCH, which may refer to that there is no PUCCH on the whole bandwidth of the OFDM symbol or there is no PUCCH on a bandwidth, occupied by the SRS resource, of the OFDM symbol but the PUCCH can be on another bandwidth.

Optionally, all the OFDM symbols allocated to the target SRS resource in the slot meeting the first preset condition may be not occupied by a PUCCH.

It is to be understood that an OFDM symbol allocated to the target SRS resource is not occupied by a PUCCH, which may refer to that there is no PUCCH on the whole bandwidth of the OFDM symbol or there is no PUCCH on a bandwidth, occupied by the SRS resource, of the OFDM symbol but the PUCCH can be on another bandwidth.

Optionally, at least one OFDM symbol among the OFDM symbols allocated to the target SRS resource in the slot meeting the first preset condition may be not occupied by a PUCCH.

It is to be understood that an OFDM symbol allocated to the target SRS resource is not occupied by a PUCCH, which may refer to that there is no PUCCH on the OFDM symbol (the whole bandwidth) or there is no PUCCH on the bandwidth, occupied by the SRS resource, of the OFDM symbol but the PUCCH can be on another bandwidth.

Optionally, a PUSCH configured in the slot meeting the first preset condition may be of the PUSCH mapping type A.

It is to be understood that a starting OFDM symbol for transmission of the PUSCH corresponding to the PUSCH mapping type A is a first OFDM symbol in the corresponding slot.

Optionally, an OFDM symbol allocated to any SRS resource in the SRS resource set in the slot meeting the first preset condition may be not scheduled to transmit a PUSCH that is of the PUSCH mapping type B.

Optionally, an OFDM symbol allocated to the target SRS resource in the slot meeting the first preset condition may be not scheduled to transmit the PUSCH that is of the PUSCH mapping type B.

It is to be understood that a starting OFDM symbol for transmission of the PUSCH corresponding to the PUSCH mapping type B may be any OFDM symbol in the corresponding slot.

Specifically, in response to that the value of K is configured for the at least one SRS resource set by the network device through the high-layer signaling, the terminal device may transmit the SRS on all SRS resources in the at least one SRS resource set in the slot meeting the first preset condition and after the K slots from reception of the DCI, namely the terminal device may send the SRS corresponding to all the SRS resources in the at least one SRS resource set in a target slot.

Specifically, in response to that the value of K is configured for each SRS resource set among the at least one SRS resource set by the network device through the high-layer signaling respectively, the terminal device may transmit the SRS on an SRS resource in a first SRS resource set in a slot meeting the first preset condition and after K1 slots from reception of the DCI, the first SRS resource set belonging to the at least one SRS resource set and K1 being a first transmission latency configured for the first SRS resource set by the network device.

Specifically, in response to that the value of K is configured for each SRS resource in the at least one SRS resource set by the network device through the high-layer signaling respectively, the terminal device may transmit the SRS on a first SRS resource in a slot meeting the first preset condition and after K2 slots from reception of the DCI, the first SRS resource belonging to the at least one SRS resource set and K2 being a second transmission latency configured for the first SRS resource by the network device. That is, the terminal device may determine a target slot for each SRS resource for SRS transmission.

Optionally, the second transmission latency K2 may be one of multiple transmission latencies configured for the first SRS resource by the network device. For example, the second transmission latency may be a first transmission latency configured for the first SRS resource by the network device.

Specifically, the terminal device may transmit the SRS on the target SRS resource in the at least one SRS resource set in a slot firstly meeting the first preset condition and after the K slots from reception of the DCI.

Specifically, the terminal device may transmit the SRS on the target SRS resource in the at least one SRS resource set on an activated BWP in the slot meeting the first preset condition and after the K slots from reception of the DCI.

It is to be understood that the activated BWP refers to a BWP indicated to transmit the PUSCH in the slot meeting the first preset condition. The terminal device may only transmit the SRS on the activated BWP. When the SRS resource set is not on the activated BWP, transmission is not needed.

Specifically, the terminal device may transmit the SRS on the target SRS resource in the at least one SRS resource set on a BWP associated with the at least one SRS resource set in the slot meeting the first preset condition and after the K slots from reception of the DCI.

It is to be understood that the network device configures a BWP associated with each SRS resource set in advance through high-layer signaling. In the slot meeting the first preset condition, a corresponding SRS can be transmitted on the associated BWP only. Herein, the associated BWP may be not a presently activated BWP. In such case, if the terminal can transmit an uplink signal on one BWP only, the PUSCH may be transmitted on the activated BWP, and SRS transmission may be stopped.

Specifically, in response to that at least one OFDM symbol among the OFDM symbols allocated to the target SRS resource in the at least one SRS resource set in the slot meeting the first preset condition is unavailable for SRS transmission, the terminal device may transmit the SRS on an OFDM symbol among the allocated OFDM symbols other than the at least one OFDM symbol.

Accordingly, in the SRS transmission method of the embodiments of the disclosure, a terminal device may transmit a SRS on a target SRS resource in at least one SRS resource set in a slot meeting a first preset condition and after K slots from reception of DCI including SRS triggering signaling, so that the terminal device can determine the slot for SRS transmission and find a proper uplink resource for sending the SRS to further ensure the uplink transmission performance.

Figure 3:
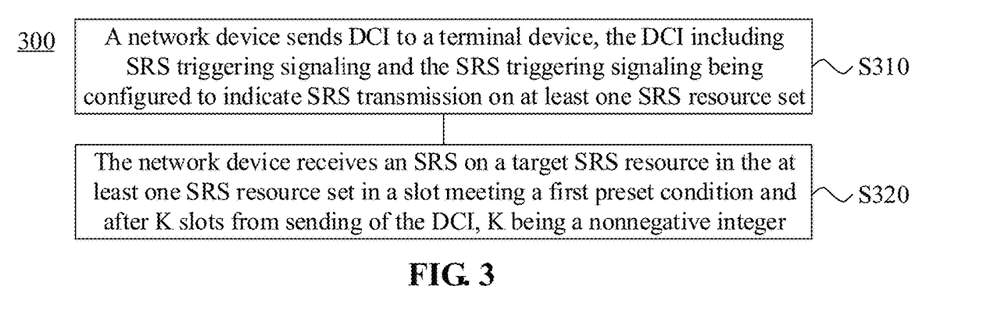
FIG. 3 is a schematic flowchart of another SRS transmission method according to an embodiment of the disclosure.

FIG. 3 is a schematic flowchart of an SRS transmission method 300 according to an embodiment of the disclosure. The method 300 may optionally be applied, but not limited, to the system shown in FIG. 1. The method 300 includes at least part of following contents.

In S310, a network device sends DCI to a terminal device, the DCI including SRS triggering signaling and the SRS triggering signaling being configured to indicate SRS transmission on at least one SRS resource set.

In S320, the network device receives an SRS on a target SRS resource in the at least one SRS resource set in a slot meeting a first preset condition and after K slots from sending of the DCI, K being a nonnegative integer.

Optionally, a value of K may be configured for the at least one SRS resource set by the network device through high-layer signaling, or, a value of K may be configured for each SRS resource set among the at least one SRS resource set by the network device through high-layer signaling respectively, or, a value of K may be configure for each SRS resource in the at least one SRS resource set by the network device through high-layer signaling respectively.

Optionally, the slot meeting the first preset condition may meet at least one of the following preset conditions:

all symbols in the slot are uplink symbols;

there are at least M uplink symbols in the slot, M being a positive integer;

last N symbols in the slot are all uplink symbols, N being a positive integer;

the slot is not configured to transmit a physical uplink control channel (PUCCH) in a target PUCCH format;

all orthogonal frequency-division multiplexing (OFDM) symbols allocated to any SRS resource in the at least one SRS resource set in the slot are uplink symbols;

all OFDM symbols allocated to the target SRS resource in the slot are uplink symbols;

all the OFDM symbols allocated to any SRS resource in the at least one SRS resource set in the slot are not occupied by a PUCCH;

all the OFDM symbols allocated to the target SRS resource in the slot are not occupied by a PUCCH;

at least one symbol in the OFDM symbols allocated to the target SRS resource in the slot is not occupied by a PUCCH;

a physical uplink shared channel (PUSCH) configured in the slot is of a PUSCH mapping type A;

an OFDM symbol allocated to any SRS resource in the SRS resource set in the slot is not scheduled for a PUSCH that is of a PUSCH mapping type B; or an OFDM symbol allocated to the target SRS resource in the slot is not scheduled for the PUSCH that is of the PUSCH mapping type B.

Specifically, in response to that the value of K is configured for the at least one SRS resource set by the network device through the high-layer signaling, the network device may receive the SRS on all SRS resources in the at least one SRS resource set in the slot meeting the first preset condition and after the K slots from sending of the DCI.

Specifically, in response to that the value of K is configured for each SRS resource set among the at least one SRS resource set by the network device through the high-layer signaling respectively, the terminal device may transmit the SRS on an SRS resource in a first SRS resource set in a slot meeting the first preset condition and after K1 slots from reception of the DCI, the first SRS resource set belonging to the at least one SRS resource set and K1 being a first transmission latency configured for the first SRS resource set by the network device.

Specifically, in response to that the value of K is configured for each SRS resource in the at least one SRS resource set by the network device through the high-layer signaling respectively, the network device may receive the SRS on a first SRS resource in a slot meeting the first preset condition and after K2 slots from sending of the DCI, the first SRS resource belonging to the at least one SRS resource set and K2 being a second transmission latency configured for the first SRS resource by the network device.

Specifically, the network device may receive the SRS on the target SRS resource in the at least one SRS resource set in a slot firstly meeting the first preset condition and after the K slots from sending of the DCI.

Specifically, the network device may receive the SRS on the target SRS resource in the at least one SRS resource set on an activated BWP in the slot meeting the first preset condition and after the K slots from sending of the DCI.

Specifically, the network device may receive the SRS on the target SRS resource in the at least one SRS resource set on a BWP associated with the at least one SRS resource set in the slot meeting the first preset condition and after the K slots from sending of the DCI.

Specifically, in response to that at least one OFDM symbol among the OFDM symbols allocated to the target SRS resource in the at least one SRS resource set in the slot meeting the first preset condition is unavailable for SRS transmission, the network device may receive the SRS on an OFDM symbol among the allocated OFDM symbols other than the at least one OFDM symbol.

It is to be understood that the SRS transmission method 300 corresponds to the corresponding operations in the method 200 and the operations in the SRS transmission method 300 may refer to descriptions about the corresponding operations in the SRS transmission method 200 and, for simplicity, will not be elaborated herein.

According to the SRS transmission method of the embodiments of the disclosure, a network device may receive a SRS on a target SRS resource in at least one SRS resource set in a slot meeting a first preset condition and after K slots from sending of DCI including SRS triggering signaling, so that the network device can determine the slot for SRS reception and find a proper uplink resource for sending the SRS to further ensure the uplink transmission performance.

Figure 4:
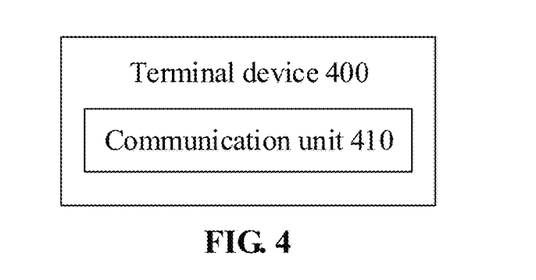
FIG. 4 is a schematic block diagram of a terminal device according to an embodiment of the disclosure.

FIG. 4 is a schematic block diagram of a terminal device 400 according to an embodiment of the disclosure. The terminal device 400 includes a communication unit 410.

The communication unit 410 is configured to receive DCI from a network device, the DCI including SRS triggering signaling and the SRS triggering signaling being configured to indicate SRS transmission on at least one SRS resource set.

The communication unit 410 is further configured to transmit an SRS on a target SRS resource in the at least one SRS resource set in a slot meeting a first preset condition and after K slots from reception of the DCI, K being a nonnegative integer.

Optionally, a value of K may be configured for the at least one SRS resource set by the network device through high-layer signaling, or, a value of K may be configured for each SRS resource set among the at least one SRS resource set by the network device through high-layer signaling respectively, or, a value of K may be configure for each SRS resource in the at least one SRS resource set by the network device through high-layer signaling respectively.

Optionally, in response to that the value of K is configured for the at least one SRS resource set by the network device through the high-layer signaling, the communication unit 410 specifically is configured to:

transmit the SRS on all SRS resources in the at least one SRS resource set in the slot meeting the first preset condition and after the K slots from reception of the DCI.

Optionally, in response to that the value of K is configured for each SRS resource set among the at least one SRS resource set by the network device through the high-layer signaling respectively, the communication unit 410 specifically is configured to:

transmit the SRS on an SRS resource in a first SRS resource set in a slot meeting the first preset condition and after K1 slots from reception of the DCI, the first SRS resource set belonging to the at least one SRS resource set and K1 being a first transmission latency configured for the first SRS resource set by the network device.

Optionally, in response to that the value of K is configured for each SRS resource in the at least one SRS resource set by the network device through the high-layer signaling respectively, the communication unit 410 specifically is configured to:

transmit the SRS on a first SRS resource in a slot meeting the first preset condition and after K2 slots from reception of the DCI, the first SRS resource belonging to the at least one SRS resource set and K2 being a second transmission latency configured for the first SRS resource by the network device.

Optionally, the communication unit 410 specifically is configured to:

transmit the SRS on the target SRS resource in the at least one SRS resource set in a slot firstly meeting the first preset condition and after the K slots from reception of the DCI.

Optionally, the communication unit 410 specifically is configured to:

transmit the SRS on the target SRS resource in the at least one SRS resource set on an activated BWP in the slot meeting the first preset condition and after the K slots from reception of the DCI; or, transmit the SRS on the target SRS resource in the at least one SRS resource set on a BWP associated with the at least one SRS resource set in the slot meeting the first preset condition and after the K slots from reception of the DCI.

Optionally, the slot meeting the first preset condition may meet at least one of the following preset conditions:

all symbols in the slot are uplink symbols;

there are at least M uplink symbols in the slot, M being a positive integer;

last N symbols in the slot are all uplink symbols, N being a positive integer;

the slot is not configured to transmit a physical uplink control channel (PUCCH) in a target PUCCH format;

all orthogonal frequency-division multiplexing (OFDM) symbols allocated to any SRS resource in the at least one SRS resource set in the slot are uplink symbols;

all OFDM symbols allocated to the target SRS resource in the slot are uplink symbols;

all the OFDM symbols allocated to any SRS resource in the at least one SRS resource set in the slot are not occupied by a PUCCH;

all the OFDM symbols allocated to the target SRS resource in the slot are not occupied by a PUCCH;

at least one symbol in the OFDM symbols allocated to the target SRS resource in the slot is not occupied by a PUCCH;

a physical uplink shared channel (PUSCH) configured in the slot is of a PUSCH mapping type A;

an OFDM symbol allocated to any SRS resource in the SRS resource set in the slot is not scheduled for a PUSCH that is of a PUSCH mapping type B; or an OFDM symbol allocated to the target SRS resource in the slot is not scheduled for the PUSCH that is of the PUSCH mapping type B.

Optionally, the communication unit 410 specifically is configured to:

in response to that at least one OFDM symbol among the OFDM symbols allocated to the target SRS resource in the at least one SRS resource set in the slot meeting the first preset condition is unavailable for SRS transmission, transmit the SRS on an OFDM symbol among the allocated OFDM symbols other than the at least one OFDM symbol.

It is to be understood that the terminal device 400 may correspond to the terminal device in the method 200 and may implement corresponding operations implemented by the terminal device in the method 200, which for simplicity, will not be elaborated herein.

Figure 5:
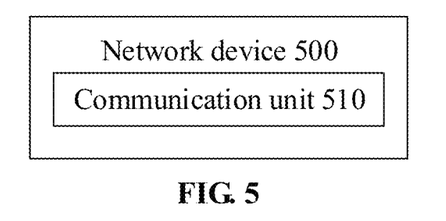
FIG. 5 is a schematic block diagram of a network device according to an embodiment of the disclosure.

FIG. 5 is a schematic block diagram of a network device 500 according to an embodiment of the disclosure. The network device 500 includes a communication unit 510.

The communication unit 510 is configured to send DCI to a terminal device, the DCI including SRS triggering signaling and the SRS triggering signaling being configured to indicate SRS transmission on at least one SRS resource set.

The communication unit 510 is further configured to receive an SRS on a target SRS resource in the at least one SRS resource set in a slot meeting a first preset condition and after K slots from sending of the DCI, K being a nonnegative integer.

Optionally, a value of K may be configured for the at least one SRS resource set by the network device through high-layer signaling, or, a value of K may be configured for each SRS resource set among the at least one SRS resource set by the network device through high-layer signaling respectively, or, a value of K may be configure for each SRS resource in the at least one SRS resource set by the network device through high-layer signaling respectively.

Optionally, in response to that the value of K is configured for the at least one SRS resource set by the network device through the high-layer signaling, the communication unit 510 specifically is configured to:

receive the SRS on all SRS resources in the at least one SRS resource set in the slot meeting the first preset condition and after the K slots from sending of the DCI.

Optionally, in response to that the value of K is configured for each SRS resource set among the at least one SRS resource set by the network device through the high-layer signaling respectively, the communication unit 510 specifically is configured to:

receive the SRS on an SRS resource in a first SRS resource set in a slot meeting the first preset condition and after K1 slots from sending of the DCI, the first SRS resource set belonging to the at least one SRS resource set and K1 being a first transmission latency configured for the first SRS resource set by the network device.

Optionally, in response to that the value of K is configured for each SRS resource in the at least one SRS resource set by the network device through the high-layer signaling respectively, the communication unit 510 specifically is configured to:

receive the SRS on a first SRS resource in a slot meeting the first preset condition and after K2 slots from sending of the DCI, the first SRS resource belonging to the at least one SRS resource set and K2 being a second transmission latency configured for the first SRS resource by the network device.

Optionally, the communication unit 510 specifically is configured to:

receive the SRS on the target SRS resource in the at least one SRS resource set in a slot firstly meeting the first preset condition and after the K slots from sending of the DCI.

Optionally, the communication unit 510 specifically is configured to:

receive the SRS on the target SRS resource in the at least one SRS resource set on an activated BWP in the slot meeting the first preset condition and after the K slots from sending of the DCI; or, receive the SRS on the target SRS resource in the at least one SRS resource set on a BWP associated with the at least one SRS resource set in the slot meeting the first preset condition and after the K slots from sending of the DCI.

Optionally, the slot meeting the first preset condition may meet at least one of the following preset conditions:

all symbols in the slot are uplink symbols;

there are at least M uplink symbols in the slot, M being a positive integer;

last N symbols in the slot are all uplink symbols, N being a positive integer;

the slot is not configured to transmit a physical uplink control channel (PUCCH) in a target PUCCH format;

all orthogonal frequency-division multiplexing (OFDM) symbols allocated to any SRS resource in the at least one SRS resource set in the slot are uplink symbols;

all OFDM symbols allocated to the target SRS resource in the slot are uplink symbols;

all the OFDM symbols allocated to any SRS resource in the at least one SRS resource set in the slot are not occupied by a PUCCH;

all the OFDM symbols allocated to the target SRS resource in the slot are not occupied by a PUCCH;

at least one symbol in the OFDM symbols allocated to the target SRS resource in the slot is not occupied by a PUCCH;

a physical uplink shared channel (PUSCH) configured in the slot is of a PUSCH mapping type A;

an OFDM symbol allocated to any SRS resource in the SRS resource set in the slot is not scheduled for a PUSCH that is of a PUSCH mapping type B; or an OFDM symbol allocated to the target SRS resource in the slot is not scheduled for the PUSCH that is of the PUSCH mapping type B.

Optionally, the communication unit 510 specifically is configured to:

in response to that at least one OFDM symbol among the OFDM symbols allocated to the target SRS resource in the at least one SRS resource set in the slot meeting the first preset condition is unavailable for SRS transmission, receive the SRS on an OFDM symbol among the allocated OFDM symbols other than the at least one OFDM symbol.

It is to be understood that the network device 500 may correspond to the network device in the method 300 and may implement corresponding operations implemented by the network device in the method 300, which for simplicity, will not be elaborated herein.

Figure 6:
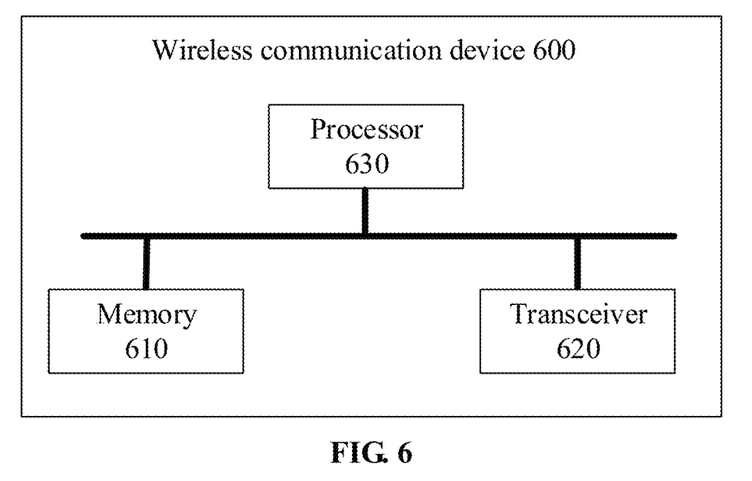
FIG. 6 is a schematic block diagram of a wireless communication device according to an embodiment of the disclosure.

FIG. 6 is a schematic block diagram of a wireless communication device 600 according to an embodiment of the disclosure. The device 600 includes a memory 610, a transceiver 620 and a processor 630.

The memory 610 is configured to store a program, the program including a code.

The transceiver 620 can communicate with another device.

The processor 630 can execute the program code in the memory 610.

Optionally, the transceiver 620 may execute signal transmission and reception under driving of the processor 630.

Optionally, when the code is executed, the processor 630 may implement each operation executed by a terminal device in the method 200 in FIG. 2. For simplicity, elaborations are omitted herein. In such case, the device 600 may be a terminal device, for example, a mobile phone.

Optionally, when the code is executed, the processor 630 may implement each operation executed by a network device in the method 300 in FIG. 3. For simplicity, elaborations are omitted herein. In such case, the device 600 may be an access network device, for example, a base station.

It is to be understood that, in the embodiment of the disclosure, the processor 630 may be a Central Processing Unit (CPU) or the processor 630 may also be another universal processor, a Digital Signal Processor (DSP), an Application Specific Integrated Circuit (ASIC), a Field Programmable Gate Array (FPGA) or another programmable logic device, discrete gate or transistor logic device and discrete hardware component and the like. The universal processor may be a microprocessor or the processor may also be any conventional processor and the like.

The memory 610 may be a read-only memory or a random access memory. The memory 620 may provide instructions and data for the processor 630. A part of the memory 610 may further include a nonvolatile random access memory. For example, the memory 610 may further store information of a device type.

The transceiver 620 can realize signal sending and receiving functions, for example, frequency modulation and demodulation functions or up-conversion and down-conversion functions.

In an implementation process, at least one operation of the method may be completed through an integrated logical circuit of hardware in the processor 630, or the integrated logical circuit may complete the at least one operation under driving of instructions in a software form. Therefore, the wireless communication device 600 can be a chip or a chip group. The operations of the method in combination with the embodiments of the disclosure can be directly embodied to be executed and completed by a hardware processor or executed and completed by a combination of hardware and software modules in the processor. The software module may be located in a mature storage medium in this field such as a random access memory, a flash memory, a read-only memory, a programmable read-only memory or electrically erasable programmable read-only memory and a register. The storage medium may be located in the memory. The processor 630 can read information in the memory and complete the operations of the methods in combination with hardware. Detailed descriptions are omitted herein to avoid repetitions.

Figure 7:
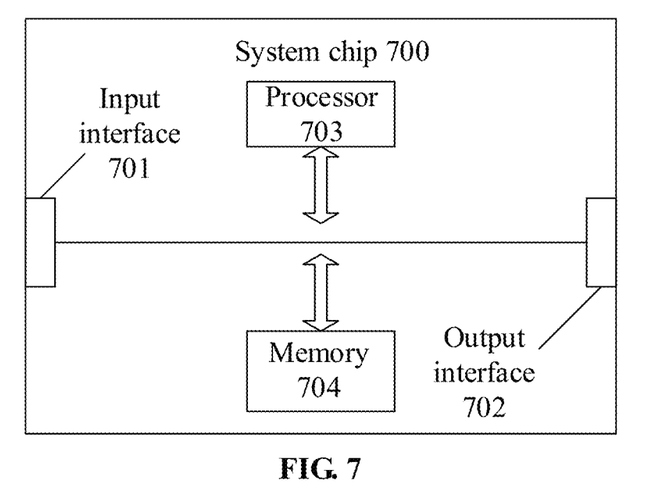
FIG. 7 is a schematic structure diagram of a system chip according to an embodiment of the disclosure.

FIG. 7 is a schematic structure diagram of a system chip 700 according to an embodiment of the disclosure. The system chip 700 of FIG. 7 includes an input interface 701, an output interface 702, a processor 703 and memory 704, which can be connected through internal communication connecting lines. The processor 703 can execute a code in the memory 704.

Optionally, when the code is executed, the processor 703 may implement methods executed by a terminal device in the method embodiments. For simplicity, elaborations are omitted herein.

Optionally, when the code is executed, the processor 703 may implement methods executed by a network device in the method embodiments. For simplicity, elaborations are omitted herein.

The embodiments may be implemented completely or partially by software, hardware, firmware or any combination thereof. During implementation with the software, the embodiments may be implemented completely or partially by a computer program product. The computer program product may include one or more computer instructions. When the computer program instructions are loaded and executed on a computer, the flows or functions according to the embodiments of the disclosure can be completely or partially generated. The computer may be a universal computer, a dedicated computer, a computer network or another programmable device. The computer instructions may be stored in a computer-readable storage medium or transmitted from one computer-readable storage medium to another computer-readable storage medium. For example, the computer instructions may be transmitted from a website, computer, server or data center to another web site, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device, such as a server and a data center, including one or more integrated available media. The available medium may be a magnetic medium (for example, a floppy disk, a hard disk and a magnetic tape), an optical medium (for example, a DVD), a semiconductor medium (for example, a Solid State Disk (SSD)) or the like.

It is to be understood that, in various embodiments of the disclosure, the sequence numbers of each process do not mean an execution order and the execution order of each process should be determined by its function and an internal logic and should not form any limit to an implementation process of the embodiments of the disclosure.

Those skilled in the art may clearly learn about that specific working processes of the system, device and unit described above may refer to the corresponding processes in the method embodiments and will not be elaborated herein for convenient and brief description.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for sounding reference signal (SRS) transmission, comprising:
receiving, by a terminal device, downlink control information (DCI) from a network device, wherein the DCI comprises SRS triggering signaling and the SRS triggering signaling is configured to indicate SRS transmission on at least one SRS resource set; and
transmitting, by the terminal device, an SRS on a target SRS resource in the at least one SRS resource set in a slot meeting a first preset condition and after K slots from reception of the DCI, K being a nonnegative integer,
wherein transmitting, by the terminal device, the SRS on the target SRS resource in the at least one SRS resource set in the slot meeting the first preset condition and after K slots from reception of the DCI comprises:
in response to that a value of K is configured for each SRS resource set among the at least one SRS resource set by the network device through high-layer signaling respectively, transmitting, by the terminal device, the SRS on an SRS resource in a first SRS resource set in the slot meeting the first preset condition and after K1 slots from reception of the DCI, wherein the first SRS resource set belongs to the at least one SRS resource set and K1 is a first transmission latency configured for the first SRS resource set by the network device; or
in response to that a value of K is configured for each SRS resource in the at least one SRS resource set by the network device through high-layer signaling respectively, transmitting, by the terminal device, the SRS on a first SRS resource in the slot meeting the first preset condition and after K2 slots from reception of the DCI, wherein the first SRS resource belongs to the at least one SRS resource set and K2 is a second transmission latency configured for the first SRS resource by the network device.

2. The method of claim 1, wherein, in response to that the value of K is configured for the at least one SRS resource set by the network device through the high-layer signaling, transmitting, by the terminal device, the SRS on the target SRS resource in the at least one SRS resource set in the slot meeting the first preset condition and after the K slots from reception of the DCI comprises:
transmitting, by the terminal device, the SRS on all SRS resources in the at least one SRS resource set in the slot meeting the first preset condition and after the K slots from reception of the DCI.

3. The method of claim 1, wherein transmitting, by the terminal device, the SRS on the target SRS resource in the at least one SRS resource set in the slot meeting the first preset condition and after the K slots from reception of the DCI comprises:
transmitting, by the terminal device, the SRS on the target SRS resource in the at least one SRS resource set in a slot first meeting the first preset condition and after the K slots from reception of the DCI.

4. The method of claim 1, wherein transmitting, by the terminal device, the SRS on the target SRS resource in the at least one SRS resource set in the slot meeting the first preset condition and after the K slots from reception of the DCI comprises:
transmitting, by the terminal device, the SRS on the target SRS resource in the at least one SRS resource set on an activated bandwidth part (BWP) in the slot meeting the first preset condition and after the K slots from reception of the DCI; or,
transmitting, by the terminal device, the SRS on the target SRS resource in the at least one SRS resource set on a BWP associated with the at least one SRS resource set in the slot meeting the first preset condition and after the K slots from reception of the DCI.

5. The method of claim 1, wherein the slot meeting the first preset condition meets at least one of following preset conditions:
all symbols in the slot are uplink symbols;
there are at least M uplink symbols in the slot, M being a positive integer;
last N symbols in the slot are all uplink symbols, N being a positive integer;
the slot is not configured to transmit a physical uplink control channel (PUCCH) in a target PUCCH format;
all orthogonal frequency-division multiplexing (OFDM) symbols allocated to any SRS resource in the at least one SRS resource set in the slot are uplink symbols;
all OFDM symbols allocated to the target SRS resource in the slot are uplink symbols;
all the OFDM symbols allocated to any SRS resource in the at least one SRS resource set in the slot are not occupied by a PUCCH;
all the OFDM symbols allocated to the target SRS resource in the slot are not occupied by a PUCCH;
at least one symbol in the OFDM symbols allocated to the target SRS resource in the slot is not occupied by a PUCCH;
a physical uplink shared channel (PUSCH) configured in the slot is of a PUSCH mapping type A;
an OFDM symbol allocated to any SRS resource in the SRS resource set in the slot is not scheduled for a PUSCH that is of a PUSCH mapping type B; or
an OFDM symbol allocated to the target SRS resource in the slot is not scheduled for the PUSCH that is of the PUSCH mapping type B.

6. The method of claim 1, wherein transmitting, by the terminal device, the SRS on the target SRS resource in the at least one SRS resource set in the slot meeting the first preset condition and after the K slots from reception of the DCI comprises:
in response to that at least one OFDM symbol among OFDM symbols allocated to the target SRS resource in the at least one SRS resource set in the slot meeting the first preset condition is unavailable for SRS transmission, transmitting, by the terminal device, the SRS on an OFDM symbol among the allocated OFDM symbols other than the at least one OFDM symbol.

7. A method for sounding reference signal (SRS) transmission, comprising:
sending, by a network device, downlink control information (DCI) to a terminal device, wherein the DCI comprises SRS triggering signaling and the SRS triggering signaling is configured to indicate SRS transmission on at least one SRS resource set; and
receiving, by the network device, an SRS on a target SRS resource in the at least one SRS resource set in a slot meeting a first preset condition and after K slots from sending of the DCI, K being a nonnegative integer,
wherein receiving, by the network device, the SRS on the target SRS resource in the at least one SRS resource set in the slot meeting the first preset condition and after the K slots from sending of the DCI comprises:
in response to that a value of K is configured for each SRS resource set among the at least one SRS resource set by the network device through high-layer signaling respectively, receiving, by the network device, the SRS on an SRS resource in a first SRS resource set in the slot meeting the first preset condition and after K1 slots from sending of the DCI, wherein the first SRS resource set belongs to the at least one SRS resource set and K1 is a first transmission latency configured for the first SRS resource set by the network device; or
in response to that a value of K is configured for each SRS resource in the at least one SRS resource set by the network device through high-layer signaling respectively, receiving, by the network device, the SRS on a first SRS resource in the slot meeting the first preset condition and after K2 slots from sending of the DCI, wherein the first SRS resource belongs to the at least one SRS resource set and K2 is a second transmission latency configured for the first SRS resource by the network device.

8. A terminal device, comprising:
a processor;
a memory configured to stored instructions executable by the processor; and
a transceiver, connected with the processor and the memory, and configured to:
receive downlink control information (DCI) from a network device, wherein the DCI comprises sounding reference signal (SRS) triggering signaling and the SRS triggering signaling is configured to indicate SRS transmission on at least one SRS resource set, and
transmit an SRS on a target SRS resource in the at least one SRS resource set in a slot meeting a first preset condition and after K slots from reception of the DCI, K being a nonnegative integer,
wherein the transceiver is specifically configured to:
in response to that a value of K is configured for each SRS resource set among the at least one SRS resource set by the network device through high-layer signaling respectively, transmit the SRS on an SRS resource in a first SRS resource set in the slot meeting the first preset condition and after K1 slots from reception of the DCI, wherein the first SRS resource set belongs to the at least one SRS resource set and K1 is a first transmission latency configured for the first SRS resource set by the network device; or
in response to that a value of K is configured for each SRS resource in the at least one SRS resource set by the network device through high-layer signaling respectively, transmit the SRS on a first SRS resource in the slot meeting the first preset condition and after K2 slots from reception of the DCI, wherein the first SRS resource belongs to the at least one SRS resource set and K2 is a second transmission latency configured for the first SRS resource by the network device.

9. The terminal device of claim 8, wherein, in response to that the value of K is configured for the at least one SRS resource set by the network device through the high-layer signaling, the transceiver specifically is configured to transmit the SRS on all SRS resources in the at least one SRS resource set in the slot meeting the first preset condition and after the K slots from reception of the DCI.

10. The terminal device of claim 8, wherein the transceiver specifically is configured to:
transmit the SRS on the target SRS resource in the at least one SRS resource set in a slot firstly meeting the first preset condition and after the K slots from reception of the DCI.

11. The terminal device of claim 8, wherein the transceiver specifically is configured to:
transmit the SRS on the target SRS resource in the at least one SRS resource set on an activated bandwidth part (BWP) in the slot meeting the first preset condition and after the K slots from reception of the DCI; or,
transmit the SRS on the target SRS resource in the at least one SRS resource set on a BWP associated with the at least one SRS resource set in the slot meeting the first preset condition and after the K slots from reception of the DCI.

12. The terminal device of claim 8, wherein the slot meeting the first preset condition meets at least one of following preset conditions:
all symbols in the slot are uplink symbols;
there are at least M uplink symbols in the slot, M being a positive integer;
last N symbols in the slot are all uplink symbols, N being a positive integer;
the slot is not configured to transmit a physical uplink control channel (PUCCH) in a target PUCCH format;
all orthogonal frequency-division multiplexing (OFDM) symbols allocated to any SRS resource in the at least one SRS resource set in the slot are uplink symbols;
all OFDM symbols allocated to the target SRS resource in the slot are uplink symbols;
all the OFDM symbols allocated to any SRS resource in the at least one SRS resource set in the slot are not occupied by a PUCCH;
all the OFDM symbols allocated to the target SRS resource in the slot are not occupied by a PUCCH;
at least one symbol in the OFDM symbols allocated to the target SRS resource in the slot is not occupied by a PUCCH;
a physical uplink shared channel (PUSCH) configured in the slot is of a PUSCH mapping type A;
an OFDM symbol allocated to any SRS resource in the SRS resource set in the slot is not scheduled for a PUSCH that is of a PUSCH mapping type B; or
an OFDM symbol allocated to the target SRS resource in the slot is not scheduled for the PUSCH that is of the PUSCH mapping type B.

13. The terminal device of claim 8, wherein the transceiver specifically is configured to:
   in response to that at least one OFDM symbol among the OFDM symbols allocated to the target SRS resource in the at least one SRS resource set in the slot meeting the first preset condition is unavailable for SRS transmission, transmit the SRS on an OFDM symbol among the allocated OFDM symbols other than the at least one OFDM symbol.

14. A non-transitory computer readable medium, having a program code stored therein that, when executed by a processor of a terminal device, causes the terminal device to implement the method of claim 1.

* * * * *